United States Patent [19]
Estrada et al.

[11] 3,953,921
[45] May 4, 1976

[54] TIELESS METHOD FOR SUPPORTING END TURNS OF A DYNAMOELECTRIC MACHINE

[75] Inventors: Luis Alberto Estrada; Warren Pierce Wielt, both of Schenectady, N.Y.

[73] Assignee: General Electric Company, Schenectady, N.Y.

[22] Filed: Mar. 18, 1975

[21] Appl. No.: 559,453

Related U.S. Application Data

[62] Division of Ser. No. 493,687, Aug. 1, 1974, Pat. No. 3,924,149.

[52] U.S. Cl. .................................. 29/596; 310/42; 310/45; 310/260
[51] Int. Cl.[2] ........................................ H02K 15/06
[58] Field of Search ................. 29/596; 310/42, 45, 310/260, 270, 194

[56] References Cited
UNITED STATES PATENTS

| 1,123,085 | 12/1914 | Brown et al. | 310/260 |
| 1,368,350 | 2/1921 | Prugger | 310/270 |
| 3,320,452 | 5/1967 | Fortenbach et al. | 310/270 |
| 3,509,621 | 5/1970 | Honsinger et al. | 29/596 |

*Primary Examiner*—Carl E. Hall
*Attorney, Agent, or Firm*—Vale P. Myles

[57] ABSTRACT

A dynamoelectric machine is provided with a tieless bracing means for rigidly supporting the winding end turns thereof in operating position. The tieless bracing arrangement affords axial and radial movement of a compressible annulus while avoiding torsion loading of the annulus support structure. A new method is also disclosed for applying a tieless bracing to a dynamoelectric machine.

3 Claims, 7 Drawing Figures

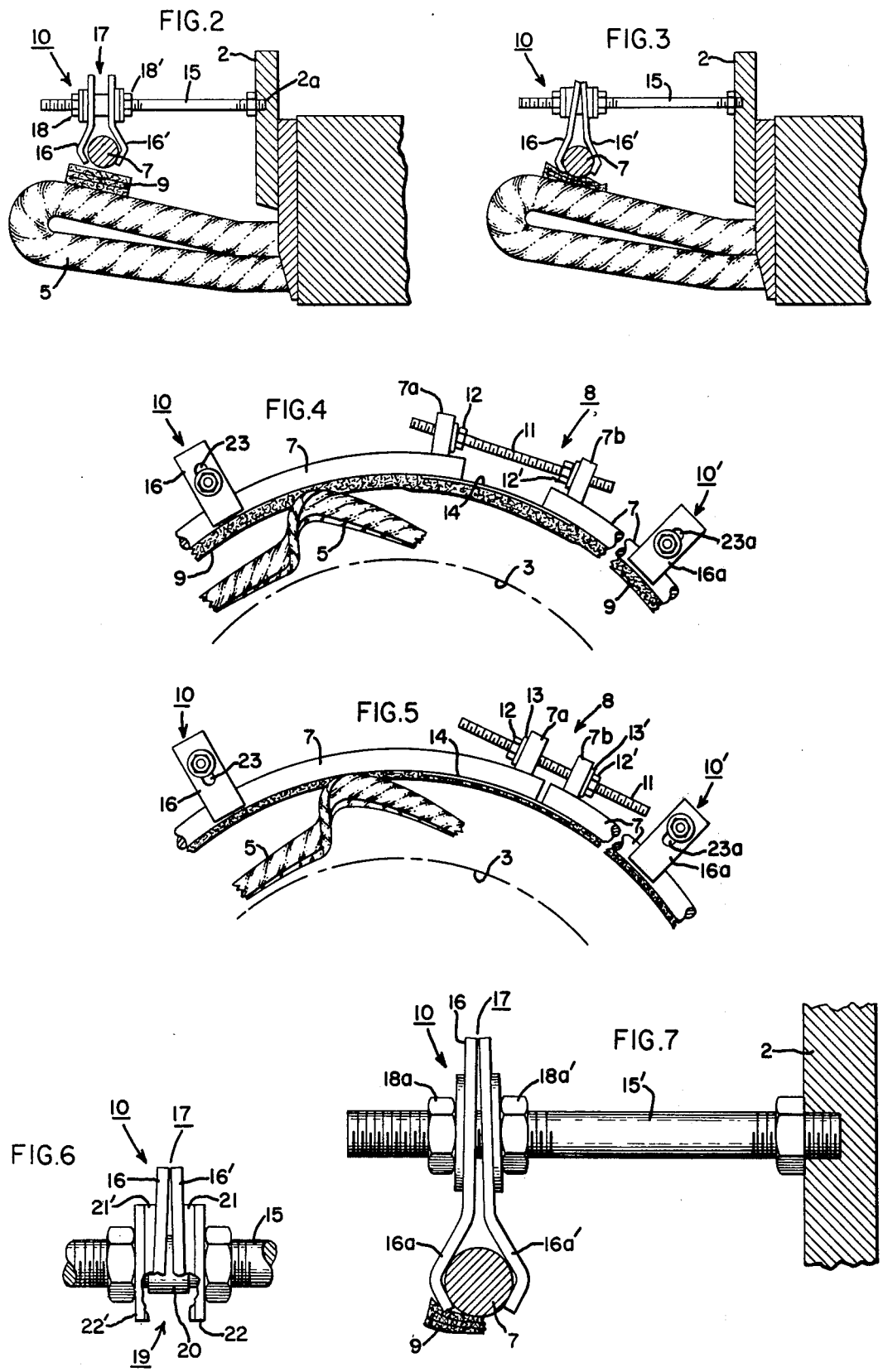

TIELESS METHOD FOR SUPPORTING END TURNS OF A DYNAMOELECTRIC MACHINE

This is a division of application Ser. No. 493,687, filed Aug. 1, 1974, now U.S. Pat. No. 3,924,149.

BACKGROUND OF THE INVENTION

The invention disclosed herein relates to dynamoelectric machines and more particularly to an improved means and method for rigidly supporting the winding end turns of a dynamoelectric machine stator ring against longitudinal and radial displacements.

It is common practice in the manufacture of dynamoelectric machines in the medium to large size ranges, i.e., from about 150 horsepower up to larger sizes, to utilize form-wound coils for assembling the energizing winding of the machine in the slots of its laminated stator. When such coils are placed in operation, the end turns thereof, which extend beyond the ends of the stator slots, are subjected to electrodynamic and mechanical forces that tend to move the coils relative to the stator. Such forces are caused by the large currents passing through the coils during starting and peak load conditions, as well as by the normal mechanical vibrations developed in the machines due to their rotation. It has long been recognized that such displacement of the end turns of the windings is disadvantageous because it destroys the winding insulation and can lead to premature electrical failure of the machine. Accordingly, numerous arrangements have been developed in the prior art for supporting the winding end turns against relative movement during operation of the machine. One early example of such a supporting arrangement is shown in U.S. Pat. No. 967,240 which was issued on Aug. 16, 1910. That patent discloses a dynamoelectric machine having a pair of rings or bands that are clamped around the outside of the coil end turns to force them into engagement with an inner ring. Over the years, various means have been developed for supporting such clamping rings in rigid position with respect to winding end turns. Typically, such rings are lashed to winding end turns with a cord or roving material that subsequently is dipped in an epoxy resin to insulate and rigidify the entire structure. Such arrangements are effective for the basic intended purpose or rigidly supporting the coil end turns, but they are relatively expensive to install.

An alternative coil supporting arrangement is disclosed in U.S. Pat. No. 3,509,621 which issued on May 5, 1970. This second patent discloses the use of a removable steel tightening band to compress the end turns of a random wound electric motor into a desired operating position prior to the application of a resin-impregnated glass band to the winding end turns to secure them in that position. A major drawback of such a mounting arrangement is that it does not afford means for re-compressing the windings in the field, should maintenance work be required on the machine. In addition, the glass banding employed to secure the windings in place is not adjustable in position relative to the winding end turns after it is applied thereon.

To overcome some of the shortcomings in such early winding supporting arrangements, so-called tieless winding supports were developed. In such tieless arrangements, adjustable brackets and clamping bolts are used to secure winding end turns in a desired rigid position. An example of such a tieless supporting arrangement is shown in U.S. Pat. No. 3,293,472 which issued on Dec. 20, 1966 and is assigned to the assignee of the present invention. An even more improved version of a tieless winding support is shown in U.S. Pat. No. 3,320,452 which issued on May 16, 1967 and is assigned to the same assignee. The tieless supporting arrangements disclosed in this last mentioned patent are particularly advantageous in that they provide adjustable means for moving a coil positioning ring in both a radial direction and in an axial direction with respect to a stator core. Thus, the winding can be adjusted in the field, i.e., after a machine leaves the factory, by using the winding support means included with the motor structure. However, due to the type of the radial adjustment means utilized in that patented arrangement, it is necessary to provide considerable access area outside of the winding end turns in order to enable a workman to reach the radial adjustment means. In many large dynamoelectric machines, the provision of such additional space tends to be prohibitively, or at least undesirably expensive because added material must be used to sufficiently enlarge the frame to accommodate the winding end turn supporting arrangement.

Accordingly, it is a primary object of the present invention to provide a tieless stator end turn supporting arrangement that overcomes the disadvantages and objections of related prior art supporting arrangements.

Another object of the invention is to provide a tieless stator end turn supporting arrangement that includes a supporting annulus adjustable in both a radial and longitudinal direction with respect to a stator core.

A further object of the invention is to provide a tieless supporting arrangement that rigidly supports stator winding end turns in operating position without creating undesirable mechanical stresses in the supporting structure due to deflection thereof during a winding-compressing operation.

A still further object of the invention is to provide a tieless supporting arrangement for stator winding end turns that incorporates means for positioning a supporting annulus in a variety of desired pre-determined positions so that a compressive force can be applied to the end turns in an optimum manner.

Yet another object of the invention is to provide an improved method of bracing the end turns of a dynamoelectric machine.

Additional objects and advantages of the invention will become apparent to those skilled in the art from the description of it that follows taken in conjunction with the accompanying drawings.

SUMMARY OF THE INVENTION

In one preferred embodiment of the invention, a tieless end turn supporting apparatus is provided for compressing and retaining the end turns of a dynamoelectric machine in a pre-determined configuration and position. The supporting apparatus comprises an expandable annulus that is releasably clamped between a plurality of arcuately-spaced-apart clamping arms, each of which are in turn adjustably supported on a plurality of threaded studs mounted in the frame of the machine housing at spaced-apart points around the periphery of the end turns. The clamping arms are operable to move the annulus to a variety of pre-determined desired positions relative to the end turns and are further operable to hold the annulus in one such axial position while allowing it to be radially adjusted to compress the end turns toward one another. A characteristic feature of the clamping arms are that they are slidably movable with respect to the threaded studs on which they are mounted so that these studs are not undesirably pre-stressed when the annulus is compressed to lock the end turns in operating position. An important aspect of the invention is the novel method by which the apparatus of the invention is applied and utilized to rigidly clamp the winding end turns of the dynamoelectric machine in a desired manner.

DESCRIPTION OF THE DRAWINGS

FIG. 2 is a side elevation of a fragment of the end turns and stator assembly shown in FIG. 1, illustrating the details of a mounting stud and associated pair of clamping arms that are used to position a radially adjustable clamping annulus of the type shown in the embodiment of the invention depicted in FIG. 1.

FIG. 3 is a side elevation of the same portion of winding end turn and stator assembly shown in FIG. 2, with the supporting means of the invention shown in an operating position in which the clamping annulus has compressed the absorbent material on the end turns and radially biased the end turns inward.

FIG. 4 is an end plan view of a portion of the clamping annulus of the invention shown in FIG. 1, illustrating the details of a take-up mechanism that is used with the tieless bracing means of the invention.

FIG. 5 is another end plan view of the same portion of the clamping annulus illustrated in FIG. 4 showing the take-up means in a position such that the annulus is substantially compressed relative to the position shown in FIG. 4.

FIG. 6 is a fragmentary, enlarged plan view, partly in cross-section, of the clamping arms and supporting studs shown in FIG. 2.

FIG. 7 is an enlarged side plan view of the clamping arms shown in FIGS. 2 and 6, with the arms shown in their compressed position around the clamping annulus.

DESCRIPTION OF SOME PREFERRED EMBODIMENTS

Figure 1:
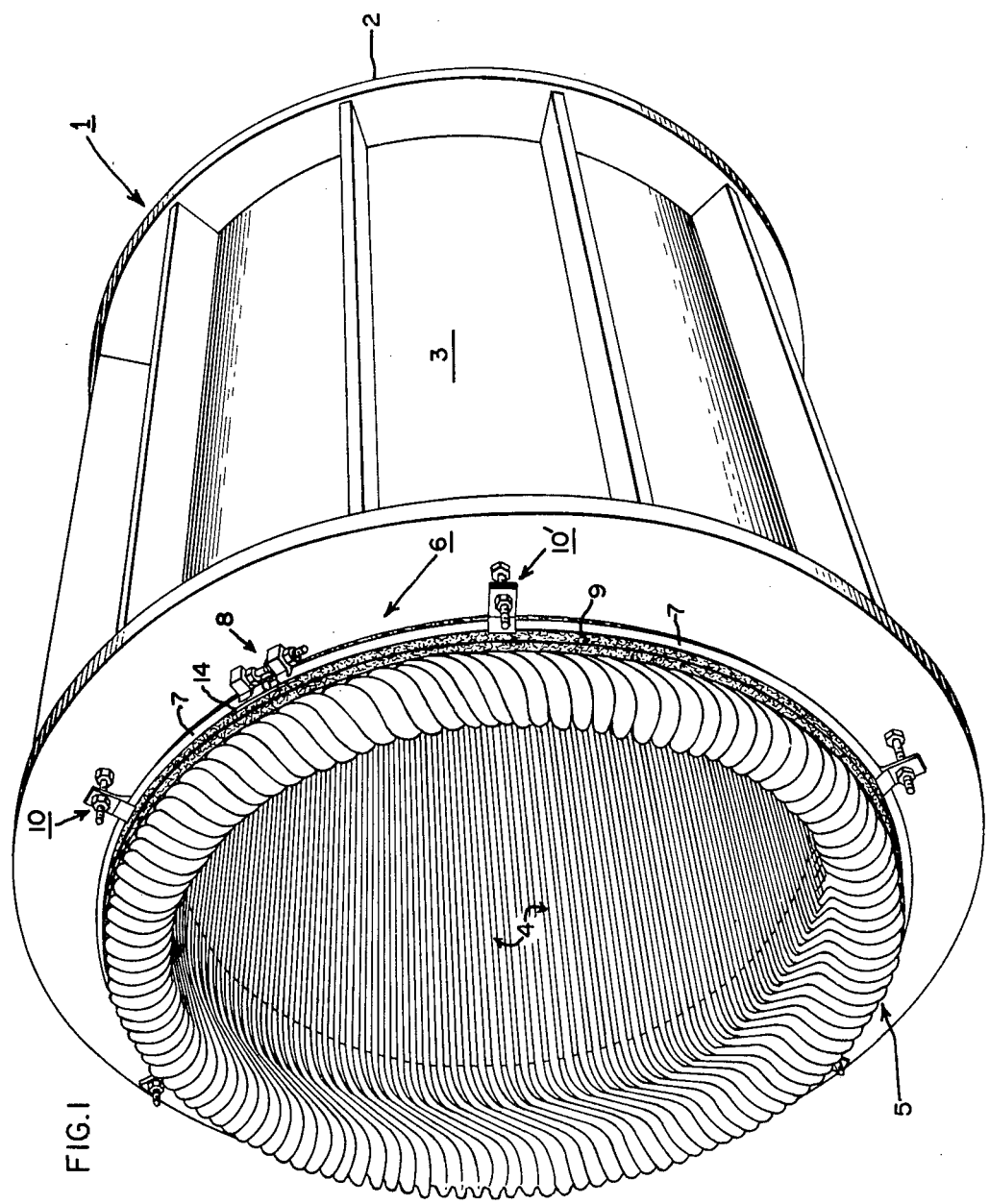
FIG. 1 is a perspective view of a dynamoelectric machine core assembly that is provided with a tieless bracing means constructed and operable pursuant to the present invention.

Referring now to FIG. 1 of the drawings, it will be seen that there is shown a dynamoelectric machine core assembly 1 which it will be understood may be made part of either an electric motor or an electric generator having generally conventional components except for the novel features of the tieless bracing means comprising the subject invention, which is disclosed herein. Thus, the machine core assembly 1 comprises a rigid frame 2 having a magnetic stator 3 mounted in fixed position within it by any suitable means such as by clamping the stator between the interior ribs of the frame 2. As is typical, the magnetic stator 3 is provided with a plurality of longitudinal slots at arcuately spaced-apart points around its inner circumference, two of such slots being indicated by the arrows 4. Each of the stator slots is adapted to receive the respective sides of two energizing winding coils in a well-known manner. One of the end turns of such an energizing coil is designated by the arrow 5 in FIG. 1. It will be understood that all of the end turns are substantially similar in form and hereinafter the number 5 will be used to designate the end turns, generally. Of course, the armature coil windings are electrically connected together in a suitable conventional manner to form an energizing winding for the machine 1.

Pursuant to the present invention, the winding end turns are rigidly secured in operating position by a tieless bracing means, indicated generally by the number 6. The bracing means 6 comprises a radially expandable and contractable split metal annulus 7 that is formed of a suitable cold rolled steel in the preferred embodiment of the invention. An adjustable take-up means 8 is mounted on the respective ends of the annulus in a manner that will be explained in greater detail below. The take-up means is manually adjustable to move the ends of the annulus toward or away from one another so that the annulus can be used to radially compress the winding end turns 5 in a radial direction. In the preferred embodiment a ring of compressible felt 9, or other suitable absorbent insulating material, is positioned in engagement with the inner side of the annulus 7 around substantially the entire circumference thereof. Alternatively, as is well-known in the dynamoelectric machine art, the ring of felt 9 may be formed by winding several relatively thin layers of felt material around the end turns, or sections of thicker material may be positioned in place under the annulus 7 before it is compressed radially inward against the end turns 5, as will be explained more fully hereinafter.

A plurality of axially adjustable annulus positioning means, two of which are designated by the identifying numbers 10 and 10', are mounted on the frame 2 at arcuately spaced-apart points radially outward from the insulated winding end turns 5 that extend beyond the ends of stator 3. These annulus positioning means form an important feature of the present invention and will be described in greater detail with particular reference to the remaining figures of the drawings. However, before discussing the detailed features of the annulus positioning means 10, 10', etc., reference may now be made to FIGS. 4 and 5 of the drawings which illustrate in detail characteristic features of take-up means 8.

FIGS. 4 and 5 respectively illustrate the annulus positioning means 10 and 10' and a section of annulus 7 mounted therebetween. As shown in FIGS. 4 and 5, the take-up means 8 comprises a pair of lip portions 7a and 7b mounted respectively on opposite ends of the split annulus 7. The lip portions can be welded or otherwise formed integrally with the annulus 7 by suitable conventional means. Each of the lip portions 7a and 7b have wall means defining an aperture therethrough that is adapted to slidably receive an elongated threaded bolt 11 on which threaded nuts 12 and 12' may be mounted, as shown in FIG. 4, to provide means for forcing the ends of annulus 7 apart when the nuts 12 and 12' are rotated in their respective threaded grooves to force the lips 7a and 7b away from one another. Such expansion of the annulus 7 is often desired to position it around the end turns 5 during the manufacture of the machine 1. The same nuts 12 and 12' may be removed from the threaded bolt 11 and mounted on the outer sides, respectively, of the lips 7a and 7b, as shown in FIG. 5, to subsequently compress the annulus 7 together, and thus compress the winding end turns 5 pursuant to the method of the invention, as will be further discussed below. Of course, if desired, an additional pair of nuts (not shown) may be used to afford this compressing function, after the nuts on the inner sides of the lips 7a and 7b are simply backed off, so that they can be left in position on the bolt. In the preferred form of the invention, the nuts 12 and 12', as shown in FIG. 5, are locked in their innermost position by bendable locking means, such as metal tabs or lockwashers 13 and 13', following a compression operation of the annulus 7.

A characteristic feature of the take-up means 8 comprises an elongated tongue member 14 that is welded, or otherwise suitably secured, to one end of the annulus 7 and disposed to abut and underlie the inner side of the other end of the annulus when its respective ends are moved within about one inch of each other by the take-up means 8. As can be seen clearly in FIG. 4, this arrangement of the tongue member 14 prevents the felt ring 9 from being pinched between the ends of split annulus 7 when they are compressed against the felt 9 and forced to move together as the winding end turns are radially compressed into a desired rigid operating position within the felt ring 9. It has also been found desirable in some applications of the invention to mount a tubular member (not shown) on the end of annulus 7 that faces the end of the annulus having the lip mounted on it. The tubular member is arranged to slidably receive the tongue member 14 therein and prevent it from shifting axially to either side of the annulus 7 as the annulus is compressed radially. Of course, other suitable clevis means could be used in lieu of such a tubular member to accomplish a similar result.

Now, to describe the characteristic features of the respective positioning means (10, 10', etc.) reference will be made to FIGS. 2 and 3. Each of the clamping means (except the one designated 10' that will be described below) is identical; consequently, a description of the clamping means 10 will suffice to describe the features of all but one (10') of the clamping means of the invention. The clamping means 10 comprises threaded stud 15 that is mounted on the frame 2 by being screwed into a suitable tapped aperture 2a therein. The longitudinal axis of stud 15 is disposed generally parallel to the axis of stator 3. An important feature of the present invention involves the sturcture and method of operation of a pair of clamping arms 16 and 16' that are mounted in movable relation to one another on the stud 15 adjacent the outer end thereof. Arms 16 and 16' are operable to hold the annulus 7 in a variety of pre-determined axial positions relative to the end turns 5. In addition, positioning means 10 includes a clamping means 17 that is mounted on the stud 15 and is operable to move the arms 16 and 16' in either direction along the stud so that the annulus 7 can be located in a desired one of the pre-determined axial positions for a given type of dynamoelectric machine 1. The clamping means 17 are further operable to force the arms 16 and 16' associated therewith together to secure the annulus between them in its desired longitudinal position relative to the end turns 5 while allowing the annulus to move freely inward relative to the stud 15.

A more detailed description of the clamping means of the preferred embodiment will now be given. In this embodiment of the invention, the clamping means 17 comprises a pair of threaded nuts 18 and 18' that are rotatably mounted in conventional threads on stud 15 and are manually operable in the manner just described to move the arms 16 and 16' and clamp them securely around the annulus 7. An important feature of the clamping arms 16 and 16' is that they are provided with elongated slots or apertures 23 and 23a (see FIG. 5) through which the threaded stud 15 is inserted. The longitudinal axes of apertures 23 and 23a are disposed substantially normal to the annulus 7. This configuration and orientation of the slots in arms 16 and 16' allows them to slide relative to the clamping nuts 18 and 18' and the stud 15 to move from their radially outward position, as shown in FIG. 2 to a more inward position, as shown in FIG. 3, without applying a biasing or stressing moment to the stud 15. Thus, the arms 16 and 16' of positioning means 10 are effective to secure the annulus 7 in said desired pre-determined axial position while at the same time, allowing the annulus to move radially inward without stressing the supporting studs 15.

In order to prevent undesirable current from circulating in the metal annulus 7 when the machine 1 is electrically energized, all of the positioning means 10, except one of them (10') is provided with dielectric means 19, as shown in FIG. 6, to insulate each of the threaded studs, respectively, from the clamping means associated therewith. The one positioning means 10' (shown in FIG. 7) and its associated clamping means 17' comprising nuts 18a and 18a' are not insulated from the clamping arms 16a and 16a', so that the clamping means 17' effectively operates as an electrical grounding circuit between annulus 7 and the machine frame 2, through the supporting stud 15', as can be seen by referring to FIG. 7.

As best seen in FIG. 6, each of the dielectric means 19 comprises an insulating bushing 20 mounted around the stud 15 between it and the arms 16 and 16', and a pair of insulating washers 21 and 21' positioned respectively around opposite ends of the bushing 20 between the respective metal washers 22 and 22' of the clamping means and the arms nearest thereto. Of course, it should be apparent that in some modifications of the invention, the clamping means 17 need not include the washers 22 and 22', but in the preferred embodiment of the invention, such washers are utilized to protect the dielectric material of insulating washers 21 and 21'.

In the preferred embodiment of the invention, each of the clamping arms are formed of steel plate stock and have annulus-receiving arcuate detents formed therein, as best seen in FIGS. 2 and 7. Preferably, the detents are each terminated in arcuate extent at a point on the circumference of annulus 7 that is spaced at least 45° from the innermost point thereof. This feature of the detents prevents them from being forced deeply into the felt ring 9 when the annulus 7 is clamped around the winding end turns 5.

The novel structure of the tieless bracing means of the invention may be used in various ways to rigidly support the winding end turns; however, the preferred method of the invention will now be described to fully explain one preferred method for applying the structure.

First, a dynamoelectric machine having a frame with a stator mounted therein will be provided and the stator will have slots adapted to receive insulated windings that extend beyond the ends of the stators when the winding is assembled therein, somewhat in the manner in which the end turns 5 extend beyond the ends of stator 3 illustrated in FIG. 1. After such a machine is provided, a plurality of threaded studs, such as the studs 15 and 15', are mounted at arcuately-spaced-apart points radially around the end turns, generally in the manner illustrated in FIG. 1. A pair of clamping arms and an associated clamping means is then mounted on each of the studs and a split metal annulus having a take-up means for reducing the diameter thereof is provided and positioned between each of the respective pair of clamping arms. Next, an absorbent, compressible felt ring is positioned between the annulus and the stator winding end turns, following which the clamping means are manually adjusted to move the annulus into a desired pre-determined axial position relative to the end turns. The take-up means on the annulus are then operated to compress the felt rings against the end turns and thereby rigidly secure them in a relatively fixed position with respect to the stator. As explained above, when the take-up means are operated to clamp the annulus around the end turns the clamping arms move radially inward with respect to the threaded studs, without exerting a stressing force on the studs. Finally, the insulated winding end turns and the felt ring are impregnated with insulating resin and the resin is cured to form a rigid insulating coating over the tieless bracing means and the winding end turns.

In alternative preferred methods of the invention, arm locking means, which may be similar to the locking tabs 13 and 13' discussed above with reference to the take-up means illustrated in FIG. 5, may be used to lock the clamping arms (shown in FIG. 3, for example) in their clamped position around the annulus 7 before the take-up means 8 (FIG. 5) are operated to compress the annulus radially and force the clamping arms to slide radially inward with respect to the supporting studs. Another alternative step in practicing the disclosed method is to provide locking means, such as the locking tabs 13 and 13' on the take-up means 8 (as shown in FIG. 5) and then actuate the take-up locking means to maintain a compressive force on the felt ring 9 after the take-up means have been adjusted to exert a desired compressive force on the ring 9.

Those skilled in the art will recognize that further modifications and improvements may be made in the structure and method of the invention as disclosed herein without departing from the true teaching and intent of the invention. Accordingly, it is our intention to define the true scope of the invention in the claims appended hereto.

What we claim and desire to secure by letters Patent of the United States is:

1. A tieless method of bracing the winding end turns of a dynamoelectric machine comprising the steps:
   1. providing a dynamoelectric machine having a frame with a stator mounted therein, said stator being provided with slots adapted to receive an insulated winding therein, said insulated winding having end turns that extend beyond opposite ends of said stator when the winding is assembled in the stator slots,
   2. mounting a plurality of threaded studs on said frame at arcuately spaced points radially outward from the end turns,
   3. mounting a pair of arms and an associated arm clamping means on each of said studs,
   4. providing a split metal annulus having a take-up means for reducing the diameter thereof, and clamping said metal annulus between the respective arms of each pair of arms,
   5. positioning an absorbent, compressible felt ring between the annulus and the stator winding end turns,
   6. adjusting the arm clamping means to move the annulus to a desired position relative to said end turns,
   7. operating said take-up means to compress the felt ring against said end turns,
   8. impregnating the winding and said felt ring with insulating resin, and
   9. curing said resin.
2. The method as defined in claim 1 including the step of:
   4a. providing arm locking means, and using said arm locking means to lock said arms in their clamped position around said annulus before the take-up means are operated to compress the annulus radially, thereby forcing the arms to slide inwardly with respect to said studs.
3. The method as defined in claim 1 including the step of:
   7a. providing take-up locking means, and actuating said locking means to maintain a compressive force on said felt ring.

* * * * *